United States Patent
Kolbe et al.

(10) Patent No.: US 11,267,215 B2
(45) Date of Patent: Mar. 8, 2022

(54) GATE OF A TABLET DISCHARGE OF A TABLET PRESS

(71) Applicant: Fette Compacting GmbH, Schwarzenbek (DE)

(72) Inventors: Sven Kolbe, Buechen (DE); Stefan Mallon, Kollow (DE); Friedrich Meissner, Schwarzenbek (DE); Jan Naeve, Kehrsen (DE); Stefan Luedemann, Hamburg (DE)

(73) Assignee: Fette Compacting GmbH, Schwarzenbek (DE)

( * ) Notice: Subject to any disclaimer, the term of this patent is extended or adjusted under 35 U.S.C. 154(b) by 247 days.

(21) Appl. No.: 16/512,488

(22) Filed: Jul. 16, 2019

(65) Prior Publication Data
US 2020/0023602 A1    Jan. 23, 2020

(30) Foreign Application Priority Data

Jul. 18, 2018  (DE) .................. 10 2018 117 351.2

(51) Int. Cl.
*B30B 15/32* (2006.01)
*B30B 15/04* (2006.01)
*B29C 43/08* (2006.01)

(52) U.S. Cl.
CPC .............. *B30B 15/32* (2013.01); *B29C 43/08* (2013.01); *B30B 15/041* (2013.01)

(58) Field of Classification Search
CPC ................................ B30B 15/32; B30B 11/08
See application file for complete search history.

(56) References Cited

U.S. PATENT DOCUMENTS

| | | | | |
|---|---|---|---|---|
| 3,536,098 A | * | 10/1970 | Cunningham | B65G 53/56 406/182 |
| 4,442,865 A | * | 4/1984 | Shigeo | B65G 53/56 137/874 |
| 5,958,467 A | * | 9/1999 | Coble | B30B 15/32 425/136 |

(Continued)

FOREIGN PATENT DOCUMENTS

| | | |
|---|---|---|
| CH | 459061 A | 6/1968 |
| CN | 2737748 Y | 2/2005 |

(Continued)

OTHER PUBLICATIONS

JP 20190129254; JP Office Action; dated Dec. 15, 2020; (5 pages).
(Continued)

*Primary Examiner* — Galen H Hauth
(74) *Attorney, Agent, or Firm* — Barclay Damon LLP

(57) ABSTRACT

A tablet discharge gate for a tablet press comprises a tablet channel having an inlet and an outlet and comprising one of a tube shape and a trough shape, a first outlet channel, and a second outlet channel. A gate chamber is positioned between the outlet of the tablet channel and the first and second outlet channels. A drive apparatus is configured to move the tablet discharge gate between a first position in which tablets are supplied from the tablet channel to the gate chamber and into the first outlet channel of the gate, and a second position in which tablets are supplied to the tablet discharge gate chamber and into the second outlet channel.

16 Claims, 3 Drawing Sheets

(56) References Cited

U.S. PATENT DOCUMENTS

| | | | | |
|---|---|---|---|---|
| 8,490,773 | B2* | 7/2013 | Kolbe | B30B 11/08 |
| | | | | 198/355 |
| 10,322,556 | B2 | 6/2019 | Carstens et al. | |
| 2006/0243325 | A1* | 11/2006 | Cedergaard | B65G 47/72 |
| | | | | 137/262 |
| 2010/0094449 | A1* | 4/2010 | Boeckx | B30B 11/005 |
| | | | | 700/110 |

FOREIGN PATENT DOCUMENTS

| | | |
|---|---|---|
| DE | 602004005586 T2 | 1/2008 |
| DE | 10210012327 A1 | 9/2011 |
| DE | 102012224061 A1 | 6/2014 |
| EP | 2151400 A2 | 2/2010 |
| JP | H06 24416 A | 2/1994 |
| JP | 2010038280 A | 2/2010 |
| JP | 2014516795 A | 7/2014 |
| WO | 2008/038070 A1 | 4/2008 |

OTHER PUBLICATIONS

JP 20190129254; English Translation of JP Office Action; dated Dec. 15, 2020; (7 pages).
EP 1918644.9; European Search Report; dated Nov. 28, 2019; (9 pages).

* cited by examiner

GATE OF A TABLET DISCHARGE OF A TABLET PRESS

CROSS REFERENCE TO RELATED INVENTION

This application is based upon and claims priority to, under relevant sections of 35 U.S.C. § 119, German Patent Application No. 10 2018 117 351.2, filed Jul. 18, 2018, the entire contents of which are hereby incorporated by reference.

BACKGROUND

The invention relates to a gate of a tablet discharge of a tablet press, wherein a drive apparatus is provided for positioning the gate between a first position in which tablets are supplied to a first outlet channel of the gate and a second position in which tablets are supplied to a second outlet channel of the gate.

Rotary tablet presses have a plurality of upper and lower punches which are always assigned in pairs to a cavity in a die plate of a rotor of the rotary tablet press. While the rotor is rotating, the cavities are filled with the filling material to be pressed. In at least one pressing apparatus, the upper and lower punches are pressed against each other in the cavities to press the filling material into tablets. After pressing, the tablets are generally ejected out of the cavities by the lower punches and, for example, supplied by a scraper to a tablet discharge. The removed tablets are for example fed to different tablet outlets by using measured values from sensors of the rotary tablet press, for example tablet discharges for good tablets, for bad tablets, or for tablets for a sampling. To guide the tablets into different tablet outlets, gates are regularly found in tablet discharges of rotary tablet presses. Such gates can for example have a gate flap that is pivotably movable between for example two switching positions and which directs the tablets, depending on the switching position, to a first tablet outlet or a second tablet outlet.

Corresponding to the high production capacities of modern rotary tablet presses, a significant stream of tablets flows through the tablet discharge. In so doing, the tablets regularly flow with only a slight distance between each other. When switching the gate, this can lead to a clamping of tablets between the gate, for example the free end of a gate flap, and an opposite wall of the tablet discharge. This can in turn lead to a tablet jam, and to a shutoff of the rotary tablet press due to a gate malfunction. This significantly restricts the availability of the rotary tablet press, and the manual effort for an operator to eliminate the malfunction is high. To eliminate a tablet jam, it is accordingly necessary to open the housing of the rotary tablet press which leads to an elevated health risk, in particular when the pressing materials are toxic. Moreover, it is regularly necessary to remove components such as the gate drives, the column of air, covers, etc. to make the region of the tablet jam accessible. The jammed tablets must be removed as well as any fragments, and the tablet discharge must be cleaned. Moreover, it must be checked whether any bad tablets or fragments have unintentionally entered into good production. Then the removed components must be remounted, and the rotary tablet press must be restarted.

In addition to tablets clamping and damage caused thereby, or respectively a tablet jam, known gates are also frequently unsuitable for so-called microtablets with a diameter of less than 2 mm, since the movable gate plates form a tolerance-related gap with adjacent components in which small tablets can become undesirably jammed.

Proceeding from the explained state of the art, the object of the invention is to provide a gate of the aforementioned type by means of which the availability of the tablet press is maximized even with high production capacities, and the effort and health hazard for operators is minimized, and that can in particular also be used for so-called microtablets.

BRIEF SUMMARY OF THE INVENTION

For a gate of the aforementioned type, the invention solves the object in that the gate comprises a trough-shaped or tube-shaped tablet channel that is adjustable by means of the drive apparatus between the first position and the second position and has an inlet and an outlet. Tablets guided through the trough-shaped or tube-shaped tablet channel are supplied to the first outlet channel in the first position of the trough-shaped or tube-shaped tablet channel, and supplied to the second outlet channel in the second position of the trough-shaped or tube-shaped tablet channel. A gate chamber forming a gap between the outlet and the first and second outlet channel is arranged between the outlet of the trough-shaped or tube-shaped tablet channel and the first and second outlet channel through which tablets from the outlet are fed to the first or second outlet channel.

The tablet press can in particular be a rotary tablet press. The gate according to the invention has a trough-shaped or tube-shaped tablet channel that can be adjusted between the first position and the second position by means of the drive apparatus and has an inlet and an outlet. The inlet and the outlet of the trough-shaped or tube-shaped tablet channel are formed in particular by its two ends. The inlet can be a tubular inlet. The outlet can be a tubular outlet. In order to switch the gate and hence guide the tablets into the first or second outlet channel, the trough-shaped or tube-shaped tablet channel is shifted, such as rotated, between a first position and a second position. The inlet to the trough-shaped or tube-shaped tablet channel communicates in both positions with the ejection apparatus of the tablet press so that tablets produced in the tablet press pass into the inlet in both positions. In the first position of the trough-shaped or tube-shaped tablet channel, the outlet communicates with a first outlet channel of the gate. Tablets guided into the trough-shaped or tube-shaped tablet channel are thus supplied to the first outlet channel. In the second position of the trough-shaped or tube-shaped tablet channel, the outlet contrastingly communicates with a second outlet channel of the gate. Tablets guided into the trough-shaped or tube-shaped tablet channel are thus supplied to the second outlet channel. The tablets can be conveyed in a manner known per se by means of gravity in the gate. The trough-shaped or tube-shaped tablet channel in particular possesses a round cross-section. It can for example possess an elliptical, circular or also a rectangular cross-section. If the tablet channel is a tubular one, it is in particular closed over its circumference. If it is a trough-shaped tablet channel, it can be opened on its top side or closed by a cover. The cross-section of the tablet channel can remain the same over its entire longitudinal extension. It may however also change.

Since an adjustable trough-shaped or tube-shaped tablet channel with a concave running surface for the tablets is used according to the invention, tablets clamping and hence tablets pushing back against the stream of tablets and tablets wedging against the side walls of the gate can be definitely avoided. Moreover, the conveyed tablets always search for the lowest point in the trough-shaped or tube-shaped running trough for reasons of gravity and therefore travel sequentially in an orderly manner with minimal mutual obstruction.

According to the invention, a gate chamber is also arranged between the outlet of the trough-shaped or tube-shaped tablet channel and the first and second outlet channel that forms a gap between the outlet and the first and second outlet channel, and through which tablets from the outlet are supplied to the first or second outlet channel. In the direction of flow of the tablets, the gate chamber forms a gap between the tubular outlet and the outlet channels. The tubular outlet and the outlet channels are at a distance from each other in the direction of flow of the tablets, wherein this distance is ensured by the gate chamber. During the gate switching process, the tablets are either guided into one or the other outlet channel, and the tablets cannot push back or clamp during the gate switching process due to the gap formed by the gate chamber. The danger of tablets getting stuck or clamping or being damaged is further minimized by the gate chamber according to the invention.

Due to its design, the gate according to the invention is suitable both for large tablets as well as for so-called microtablets with a diameter of less than 2 mm. Tablets that have problematic shapes in other gates such as tablets with a low bar height, can also be easily and safely conveyed. This is also achieved in that the running surfaces of the individual components of the gate according to the invention each have an overlap with each other.

Of course, the gate according to the invention could also comprise more than two outlet channels such as three outlet channels with which the trough-shaped or tube-shaped tablet channel can optionally communicate by being adjusted, for example by being rotated, so that the tablets are always supplied to one of the outlet channels.

All of the components of the gate according to the invention can be comprised of a metal such as stainless steel, a plastic, or ceramic.

According to one embodiment, it can be provided that the trough-shaped or tube-shaped tablet channel can rotate about a rotary axis or axis of rotation, and the inlet of the trough-shaped or tube-shaped tablet channel is arranged coaxial to the rotary axis, and the outlet is arranged non-coaxial to the rotary axis. The inlet is coaxial, or respectively concentric to the rotary axis. The inlet therefore does not change its position during the rotation. It is connected to the ejection apparatus for tablets produced in the tablet press. Tablets produced in the tablet press enter into the inlet in each rotary position of the trough-shaped or tube-shaped tablet channel. A tubular section, for example extending along a straight longitudinal axis up to a first curve can connect to the inlet. Its longitudinal axis then forms the rotary axis of the trough-shaped or tube-shaped tablet channel. The outlet is contrastingly arranged non-coaxial, or respectively eccentric to the rotary axis of the trough-shaped or tube-shaped tablet channel. It therefore changes its position with the change of the rotary position of the trough-shaped or tube-shaped tablet channel. In particular, the outlet can be located completely outside of the rotary axis of the trough-shaped or tube-shaped tablet channel. Since the trough-shaped or tube-shaped tablet channel is rotated to switch the gate, an impacting of tablets against surfaces or edges, in particular at a right angle, is avoided, even during the switching process. Instead, a soft switching of direction for the tablets is achieved, like a water slide. Mechanical stresses on the tablets as well as the danger of clamping and an associated tablet jam are minimized.

Alternatively, it would also be conceivable for the trough-shaped or tube-shaped tablet channel to not be rotated but moved in another way, for example swung, for adjustment.

According to another embodiment, a guiding apparatus can be arranged in the gate chamber which supplies tablets coming from the tubular outlet either to the first outlet channel or the second outlet channel depending on the position of the tubular tablet channel. Such a guiding apparatus further improves the tablet guidance.

The guiding apparatus can at least comprise a guiding element arranged stationary in the gate chamber. The guiding element can for example be a guide plate. The guiding element can for example have an inverted V-shaped cross-section, i.e., with the tip of the V pointing upward. The tablets are then either guided into a first side of the gate chamber or into a second side of the gate chamber by the V-shaped flanks of the guiding element. Each side of the gate chamber leads to one of the outlet channels. The guiding element can separate these sides from each other. This achieves a particularly reliable distribution of the tablets to the outlet channels.

According to another embodiment, it can be provided that the guiding apparatus comprises at least one guide body that can be adjusted between an active position and a passive position in the gate chamber, wherein a guide body drive is provided that adjusts the guide body during the movement of the trough-shaped or tube-shaped tablet channel between the first and the second position into the passive position. The guide body can be driven by an independent drive or indirectly by the adjusting movement of the trough-shaped or tube-shaped tablet channel. For example, the guide body can comprise a drive section that entrains the trough-shaped or tube-shaped tablet channel during its adjusting movement. An elastic drive section would be conceivable, for example, which is elastically deformed in a first direction while the guide body is being driven during an adjusting movement of the trough-shaped or tube-shaped tablet channel, and that independently resumes shape when the trough-shaped or tube-shaped section moves back, and thereby also adjusts the guide body back. The adjustable guide body is for example normally located in its active position in which it separates the outlet channels, or respectively the sides of the gate chamber from each other so that tablets cannot switch between the sides of the gate chamber leading to the outlet channels. The guide body is adjusted to a passive position while the gate is being positioned, i.e., during the adjusting movement of the trough-shaped or tube-shaped tablet channel, for example at least partially withdrawn from the gate chamber. This does not interfere with the movement of the trough-shaped or tube-shaped tablet channel. After the gate has been positioned, the guide body is returned to the active position, for example reintroduced into the gate chamber. It can be provided in addition or alternatively to a stationary guiding element such as a guide plate. The guide body forms a separating body. It can for example be designed as a partition or separating plate, such as a silicone plate. The guide body can for example be placed in the middle between the outlet channels and swung away when the gate is switched. The guide body causes a reliable separation of the tablets and hence guidance into the desired outlet channel without an impairment of the movement process of the tablet channel being able to occur. The guide body drive can for example comprise an electric motor, a pneumatic or an electromagnetic drive.

According to another embodiment, the first outlet channel and/or the second outlet channel can be trough-shaped or tube-shaped. This further enhances the problem-free removal of the tablets while minimizing the danger of damage, clamping, etc.

According to one very practical embodiment, the trough-shaped or tube-shaped tablet channel can be formed by a curved tube. The tube can for example be curved twice so that a first tubular section forming the inlet runs offset, preferably offset in a parallel manner, to a second tubular section forming the outlet. The tablet channel, in particular the curved tube can for example be comprised of metal such as a stainless steel.

According to another embodiment, the outlet can be formed in a rotary disk rotatingly driven by the drive apparatus. The rotary disk then has a circular opening, for example, that forms the outlet to the trough-shaped or tube-shaped tablet channel. The circular opening is then arranged eccentrically, in particular outside of the rotary axis of the rotary disk. A drive shaft can be arranged on the rotary disk, for example connected integrally thereto, which is rotated by the drive apparatus.

According to another embodiment, the rotary disk can seal the gate chamber on one side. This prevents tablets from flowing out into undesired regions.

According to another particularly practical embodiment, the drive apparatus can comprise an electric motor. Pneumatic or electromagnetic drive apparatuses are also conceivable.

The gate can furthermore comprise a housing. The housing can for example be sectionally transparent so that the tablet discharge can be visually checked through the gate. Transparent plastic or acrylic such as Plexiglas® is, for example, possible as a material for an at least sectionally transparent housing.

The invention also relates to a gate arrangement comprising several gates according to the invention that are arranged in a row. An outlet channel for the first gate in the direction of flow of the tablets can then lead to an inlet for the trough-shaped or tube-shaped tablet channel of the second gate in the direction of flow of the tablets. Another outlet channel of the first gate in the direction of flow of the tablets can then lead for example to a bad channel for bad tablets. The first and second outlet channel of the second gate in the direction of flow of the tablets can for example form a good channel for good tablets and a sample channel for a measurement arrangement for a sampling. For example, a total of three outlet channels can be used: one for good tablets, one for bad tablets and one for a sampling. Provided that the gate arrangement has several gates, they can be arranged in a common housing in a particularly practical manner.

The invention also relates to a rotary tablet press comprising a rotor that can be rotated by means of a rotary drive, wherein the rotor has an upper punch guide for upper punches of the rotary tablet press, a lower punch guide for lower punches of the rotary tablet press and a die plate arranged between the punch guides, wherein the punches interact with cavities in the die plate, furthermore comprising a filling apparatus by means of which filling material to be pressed is added to the cavities in the die plate, furthermore comprising at least one upper pressing apparatus and at least one lower pressing apparatus that, during operation, interact with the upper punches and the lower punches such that they press the filling material into tablets in the cavities in the die plate, and moreover comprising an ejection apparatus in which tablets generated in the cavities are ejected, and comprising a tablet discharge that is fed the ejected tablets, wherein at least one gate according to the invention is arranged in the tablet discharge.

BRIEF DESCRIPTION OF THE DRAWINGS

Exemplary embodiments of the invention are explained in greater detail below based on figures. Schematically.

The same reference numbers refer to the same objects in the figures unless indicated otherwise.

DETAILED DESCRIPTION OF THE INVENTION

Figure 1:
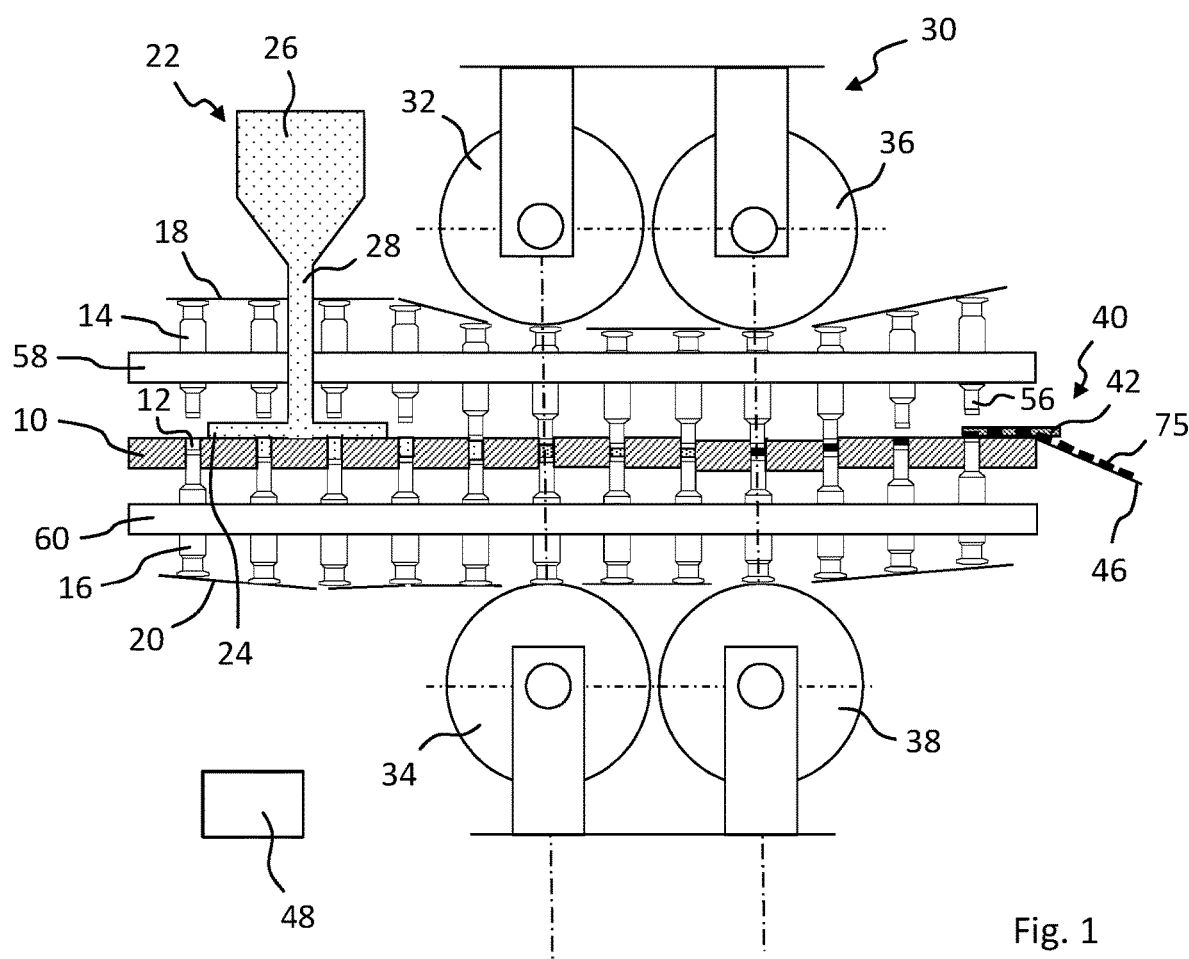
FIG. 1 illustrates a cross sectional view of an embodiment of a rotary tablet press.

The rotary tablet press shown in FIG. 1 comprises a rotor that is rotationally driven by a rotary drive (not shown) with a die plate 10 which has a plurality of cavities 12. The cavities 12 can for example be formed by holes in the die plate 10. Furthermore, the rotor comprises a plurality of upper punches 14 and lower punches 16 that rotate synchronously with the die plate 10. In each case, a pair consisting of an upper punch 14 and a lower punch 16 is assigned to a cavity 12. The axial movement of the upper punches 14 and lower punches 16 during the rotation of the rotor is controlled by upper control cam elements 18 and lower control cam elements 20. The rotary tablet press moreover comprises a filling apparatus 22 which has a filling chamber 24. The filling apparatus 22 moreover comprises a funnel-shaped filling material reservoir 26 which is connected by a feed section 28 to the filling chamber 24. In this manner, the powdered filling material in the present example passes under the force of gravity from the filling material reservoir 26 via the feed section 28 into the filling chamber 24, and passes therefrom via a filling opening provided in the bottom side of the filling chamber 24 into the cavities 12 of the die plate 10, again under the force of gravity.

Moreover, the rotary tablet press comprises a pressing apparatus 30. The pressing apparatus 30 possesses a pre-pressing apparatus with an upper pre-pressing roller 32 and a lower pre-pressing roller 34, as well as a main pressing apparatus with an upper main pressing roller 36 and a lower main pressing roller 38. Furthermore, the rotary tablet press comprises an ejection apparatus 40, in the present case with a scraper 42 which supplies the tablets 75 produced in the rotary tablet press to a tablet discharge 46.

A control apparatus for operating the rotary press is shown with reference number 48. The control apparatus 48 is in communication with, inter alia, the rotary drive of the rotor. The control apparatus 48 can for example comprise a computer processor, microprocessor, microcontroller, or similar device.

Figure 2:
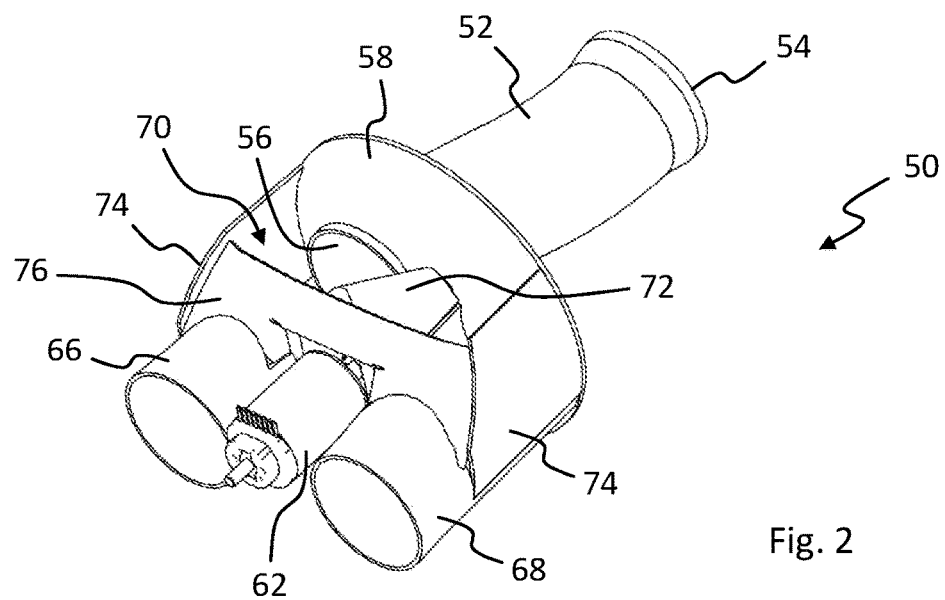
FIG. 2 illustrates a perspective view of an embodiment of a gate the rotary tablet press shown in FIG. 1.
Figure 3:
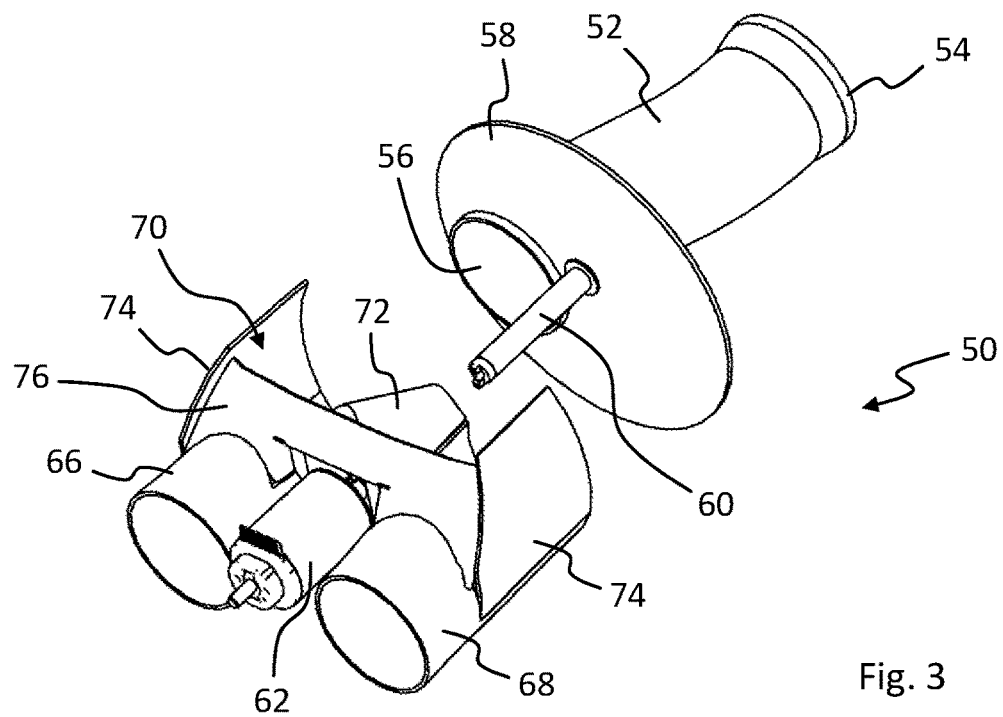
FIG. 3 illustrates an exploded view of the embodiment of the gate from FIG. 2.
Figure 4:
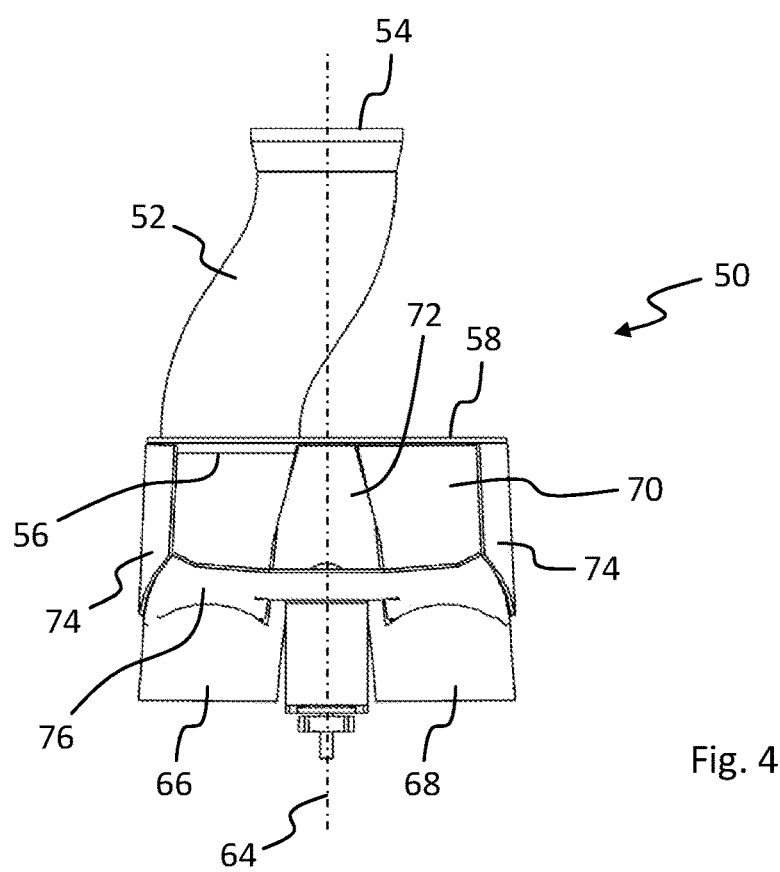
FIG. 4 illustrates a plan view of the embodiment of the gate from FIG. 2.

According to an embodiment, the gate 50 shown in FIGS. 2 to 4 can be arranged in the tablet discharge 46 of the rotary tablet press shown in FIG. 1. The gate 50 comprises a tubular tablet channel 52 in the shown example with a circular cross-section in the shown example, and a path that curves twice as can be seen in particular in FIG. 4. The first end of the tubular tablet channel 52 forms an inlet 54. The second end of the tubular tablet channel 52 forms an outlet 56. The inlet 54 and outlet 56 are circular corresponding to the cross-section of the tubular tablet channel 52.

As can be seen in FIG. 3, the outlet 56 is defined in an also circular rotary disk 58. In the center of the circular rotary disk 58, a drive shaft 60 is arranged, the free end of which is discernible in FIG. 3. The free end of the drive shaft 60 is non-rotatably connected to the drive shaft of an electric motor 62 of a drive apparatus of the gate 50. In this manner, the circular rotary disk 58, and with it the tubular tablet channel 52, can be rotated to position the gate 50 about a rotary axis 64 drawn in FIG. 4. It is discernible in this case that the tube section forming the inlet 54 and hence the inlet itself as well, are coaxial to the rotary axis 64, whereas the tube section forming the outlet 56, and hence the outlet 56 as well, are eccentric to the rotary axis 64, in particular completely outside of the rotary axis 64. During a rotation of the tubular tablet channel 52, the inlet 54 therefore does not change its position, while the outlet 56 is rotated about the rotary axis 64 as will be explained in greater detail below.

In an embodiment, the gate 50 comprises a first outlet channel 66, that is also tubular in the shown example, with a circular cross-section, and a second outlet channel 68, that is also tubular in the shown example, with a circular cross-section. The first outlet channel 66 can for example lead to a good channel for good tablets. The second outlet channel 68 can for example lead to a bad channel for bad tablets.

A gate chamber 70 is formed between the outlet 56 of the tubular tablet channel 52 and the first and second outlet channel 66, 68. A stationary guiding element 72 such as a guide plate is arranged in the gate chamber 70 in the shown example. As shown, the guiding element 72 comprises a substantially V-shaped cross-section, wherein the tip of the V points upward in FIG. 2. Tablets 75 conveyed through the tubular tablet channel 52 pass through the outlet 56 into the gate chamber 70 and from there to one of the two outlet channels 66, 68 depending on the rotary position of the tubular tablet channel 52. In the position of the gate shown in FIG. 2, the tablets 75 pass from the outlet 56 into the first outlet channel 66. The guiding element 72 prevents tablets 75 from unintentionally entering into the second outlet channel 68. If in contrast the tubular tablet channel 52 is rotated by means of the electric motor 62 into its second position, clockwise in FIG. 2, the outlet 56 is located on the other side of the guiding element 72 in a mirrored fashion. Tablets 75 conveyed through the tubular tablet channel 52 and the outlet 56 into the gate chamber 70 are then guided into the second outlet channel 68, wherein the guiding element 72 again prevents tablets 75 from unintentionally entering the first outlet channel 66. Side walls 74 and a front wall 76 are also discernible in the figures that delimit the gate chamber 70 on the sides and at the front. The gate chamber 70 is delimited at the rear by the rotary disk 58 in the shown example. The top side of the gate chamber 70 that is shown open in the figures can also of course be closed by a corresponding wall part. The gate 50 can be controlled by the control apparatus 48.

Figure 5:
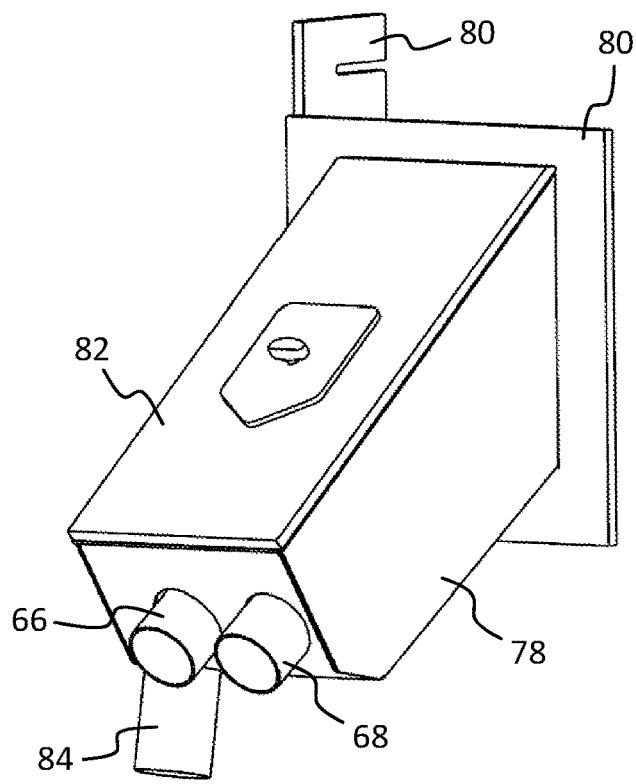
FIG. 5 illustrates a perspective view of an embodiment of a gate a rotary tablet press.
Figure 6:
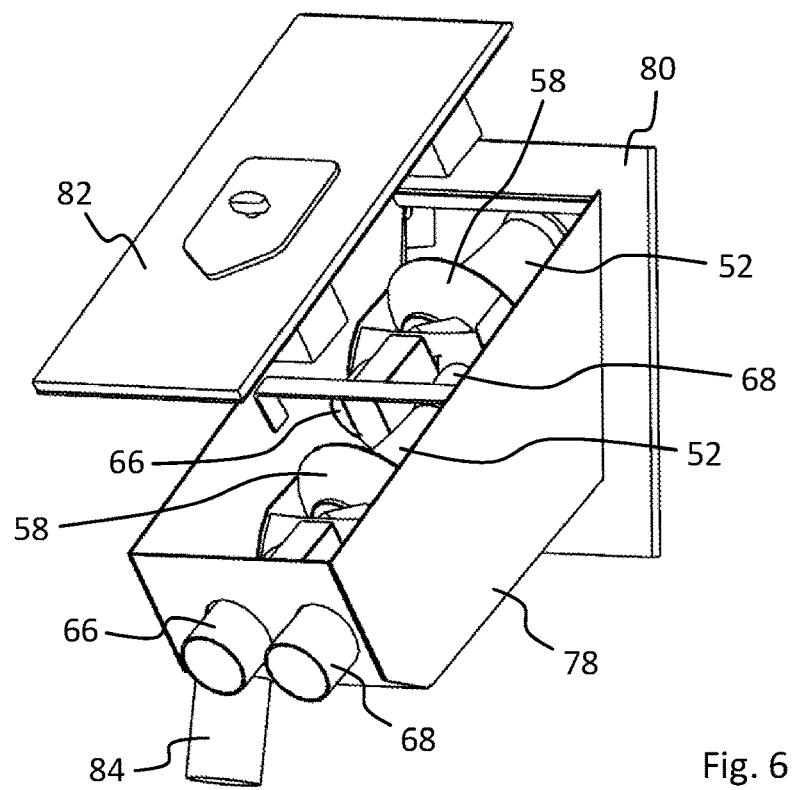
FIG. 6 illustrates a partially exploded view of the embodiment of the gate from FIG. 5.

A gate arrangement according to the invention that can be arranged in the tablet discharge 46 of the rotary tablet press shown in FIG. 1 will be explained with reference to FIGS. 5 and 6. The gate arrangement comprises two gates 50 arranged in a row as shown in FIG. 6. The two gates 50 are arranged in a common housing 78. The housing 78 comprises a mounting section 80 configured to mount the housing 78 to the press housing of the rotary tablet press shown in FIG. 1. Moreover, the housing 78 may comprise a transparent housing cover 82 comprised of plastic or acrylic such as Plexiglas®. The first and second outlet channel 66, 68 of the second gate in the direction of flow of the tablets 75 run out of the housing 78 through two openings in the housing 78. The housing 78 moreover has a discharge channel 84 for discharging tablets fed to the first outlet channel 66 of the first gate 50 in the direction of flow of the tablets 75. This discharge channel 84 can for example be used as a bad channel for bad tablets.

As discernible in particular in FIG. 6, the second outlet channel 68 of the first gate 50 in the direction of flow of the tablets 75 leads to the inlet 54 of the second gate 50 in the direction of flow of the tablets 75. Depending on the switching position of the first gate 50 in the direction of flow of the tablets 75, the tablets are thus fed through the first outlet 66 of the first gate into the discharge channel 84, or into the inlet 54 of the second gate 50 in the direction of flow of the tablets 75. Depending on the switching position of the second gate in the direction of the flow of the tablets 75, the tablets 75 that are fed thereto are then fed to the first outlet channel 66 of the second gate or into the second outlet channel 68 of the second gate. These outlet channels 66, 68 of the second gate can then for example lead to a good channel for good tablets, or respectively a sampling channel for a random removal of tablets 75. The gate arrangement can also be controlled by the control apparatus 48.

LIST OF REFERENCE NUMBERS

10 Die plate
12 Cavities
14 Upper punches
16 Lower punches
18 Upper control cam elements
20 Lower control cam elements
22 Filling apparatus
24 Filling chamber
26 Filling material reservoir
28 Feed section
30 Pressing apparatus
32 Upper pre-pressing roller
34 Lower pre-pressing roller
36 Upper main pressing roller
38 Lower main pressing roller
40 Ejection apparatus
42 Scraper
46 Tablet discharge
48 Control apparatus
50 Gate
52 Tablet channel
54 Inlet
56 Outlet
58 Rotary disk
60 Drive shaft
62 Electric motor
64 Rotary axis
66 First outlet channel
68 Second outlet channel
70 Gate chamber
72 Guiding element
74 Side walls
75 Tablets
76 Front wall
78 Housing
80 Mounting section
82 Housing cover
84 Discharge channel

The invention claimed is:
1. A tablet discharge gate for a tablet press comprising:
   a tablet channel defining a running surface and having an inlet and an outlet and comprising a tube shape;

a first outlet channel;
a second outlet channel;
a gate chamber positioned between the outlet of the tablet channel and the first and second outlet channels, wherein the gate chamber defines a gap between the tablet channel outlet and the first and second outlet channel that inhibits tablet push back and clamping during a gate switching process;
a drive apparatus configured to move the tablet discharge gate between a first position in which tablets are supplied from the tablet channel to the gate chamber and into the first outlet channel of the gate, and a second position in which tablets are supplied from the tablet channel to the gate chamber and into the second outlet channel; and
a guiding apparatus comprising a guiding element positioned in the gate chamber and defining a running surface, wherein the guiding element is configured to guide tablets from the tablet channel to the first outlet channel or the second outlet channel, wherein a portion of the running surface of the guiding element is overlapped by a portion of the running surface of the tablet channel.

2. The tablet discharge gate according to claim 1, wherein the tablet channel is configured to rotate about a rotary axis, and wherein the inlet of the tablet channel is positioned coaxial to the rotary axis and the outlet of the tablet channel is positioned non-coaxial to the rotary axis.

3. The tablet discharge gate according to claim 1, wherein the guiding element is configured to prevent tablets from unintentionally moving between the first outlet channel and the second outlet channel.

4. The tablet discharge gate according to claim 3, wherein the guiding element is stationary in the gate chamber.

5. The tablet discharge gate according to claim 3, wherein the guiding apparatus comprises at least one guide body configured to be adjusted between an active position and a passive position within the gate chamber, and wherein a guide body drive is configured to adjust the guide body into the passive position during movement of the tablet channel between the first and the second position.

6. The tablet discharge gate according to claim 5, wherein the active positioned is defined when the at least one guide body separates the first outlet channel from the second outlet channel.

7. The tablet discharge gate according to claim 1, wherein at least one of the first outlet channel and the second outlet channel comprises one of a trough-shape and a tube-shape.

8. The tablet discharge gate according to claim 2, wherein the tablet channel comprises a curved tube.

9. The tablet discharge gate according to claim 8, wherein the outlet of the tablet channel is defined on a rotary disk configured to be rotatably driven by the drive apparatus.

10. The tablet discharge gate according to claim 9, wherein the rotary disk is configured to block one side of the gate chamber.

11. The tablet discharge gate according to claim 1, wherein the drive apparatus comprises one of an electric motor, a pneumatic drive, and an electromagnetic drive.

12. The tablet discharge gate according to claim 1, further comprising a housing.

13. A rotary tablet press comprising:
a tablet discharge comprising at least one gate, the at least one gate comprising,
  a tablet channel defining a running surface and having an inlet and an outlet, wherein the tablet channel comprises a tube shape,
  a first outlet channel,
  a second outlet channel,
  a gate chamber positioned between the outlet of the tablet channel and the first and second outlet channels,
  a drive apparatus configured to move the at least one gate between a first position in which tablets are supplied from the tablet channel to the gate chamber and into the first outlet channel of the gate, and a second position in which tablets are supplied from the tablet channel to the gate chamber and into the second outlet channel, and
  a guiding element positioned in the gate chamber and defining a running surface, wherein the guiding element is configured to guide tablets from the tablet channel to the first outlet channel or the second outlet channel, wherein a portion of the running surface of the guiding element is overlapped by a portion of the running surface of the tablet channel.

14. The rotary tablet press according to claim 13, wherein the tablet discharge comprises a gate arrangement comprising at least two gates arranged consecutively along a direction of tablet flow.

15. The rotary tablet press according to claim 14, wherein the gate arrangement is positioned within a housing.

16. The rotary tablet press according to claim 13, wherein the gate chamber defines a gap between the tablet channel outlet and the first and second outlet channel that inhibits tablet push back and clamping during a gate switching process.

* * * * *